United States Patent [19]

Bradley et al.

[11] Patent Number: 4,568,802

[45] Date of Patent: Feb. 4, 1986

[54] VF LINE FAULT ISOLATION AND DIAGNOSTIC APPARATUS AND METHOD

[75] Inventors: Frank R. Bradley, Cliffside Park; David J. Nye, Englewood, both of N.J.

[73] Assignee: Bradley Telcom Corp., Leonia, N.J.

[21] Appl. No.: 606,278

[22] Filed: May 2, 1984

[51] Int. Cl.$^4$ .............................................. H04M 3/32
[52] U.S. Cl. ...................... 179/175.31 R; 179/175.3 F; 179/84 VF
[58] Field of Search ................... 179/175.3 R, 175.3 F, 179/175.31 R; 370/15

[56] References Cited

U.S. PATENT DOCUMENTS 4,211,920 7/1980 Wakabayashi .......... 179/175.3 F X
4,317,010 2/1982 Fillot ........................ 179/175.3 F X
4,484,035 11/1984 Graham et al. ................ 179/84 VF Primary Examiner—Stafford D. Schreyer
Attorney, Agent, or Firm—Gottlieb, Rackman & Reisman

[57] ABSTRACT

An addressed transmission line test system having bidirectional input and output lines with through connections in a quiescent state which is capable of recognizing properly addressed signals at either direction input for breaking the through connections and for allowing responses to commands sent from either direction for controlling the application of signals to the other direction.

26 Claims, 6 Drawing Figures

FIG. 1
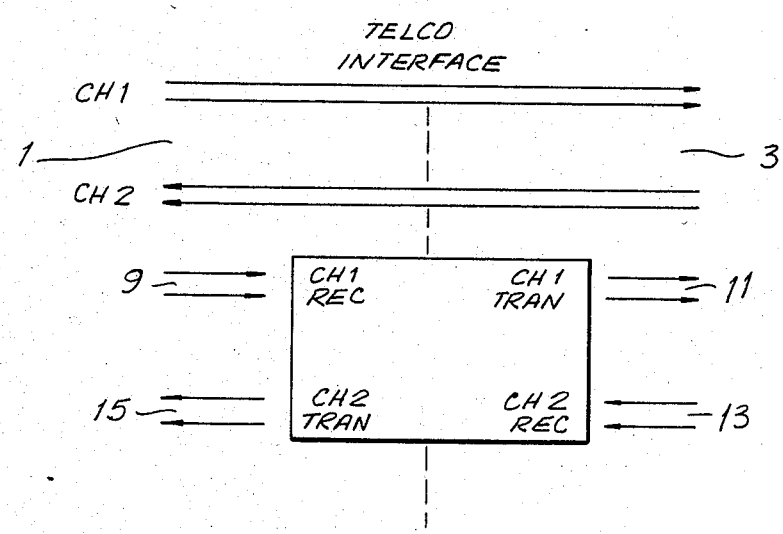
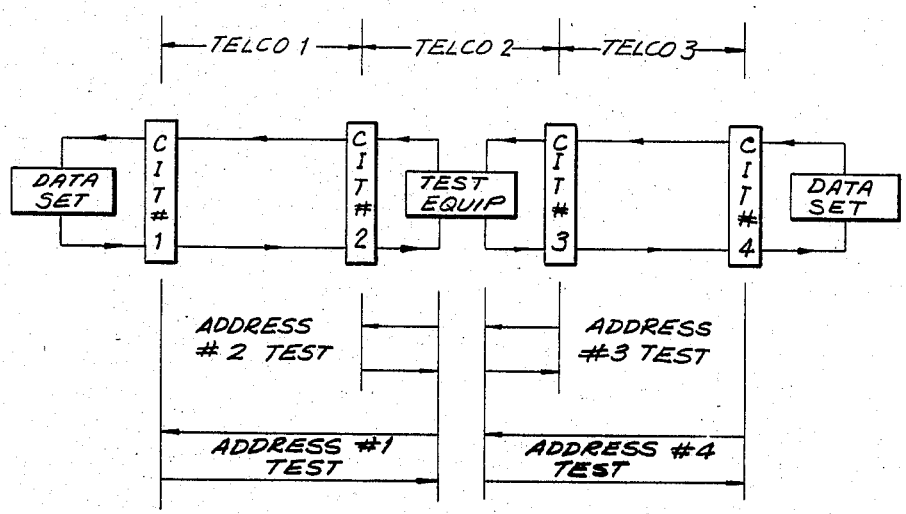
FIG. 3

FIG. 4

| COLUMN | 1209 Hz | 1336 Hz | 1477 Hz | 1633 Hz | ROW |
|---|---|---|---|---|---|
| 697 Hz | 1 | 2 | 3 | A | |
| 770 Hz | 4 | 5 | 6 | B | |
| 852 Hz | 7 | 8 | 9 | C | |
| 941 Hz | * | 0 | # | D | |

STANDARD DTMF LAYOUT

| COLUMN | 1147 Hz | 1268 Hz | 1402 Hz | 1550 Hz | ROW |
|---|---|---|---|---|---|
| | 1 | 2 | 3 | A | 661 Hz |
| | 4 | 5 | 6 | B | 731 Hz |
| | 7 | 8 | 9 | C | 809 Hz |
| | * | 0 | # | D | 893 Hz |

OFFSET DTMF LAYOUT

VF LINE FAULT ISOLATION AND DIAGNOSTIC APPARATUS AND METHOD

This invention relates to a carrier interface tester (CIT) for use with four-wire voice frequency (VF) phone lines. More particularly, this invention relates to apparatus and methods for identifying and diagnosing the portion of a long distance telephone carrier line that is the source of noise, where several carriers may have responsibility for different portions of the line.

In my U.S. Pat. Nos. 4,021,625 and 4,061,892 there are disclosed instruments and methods for measuring the characteristics of a selected portion of a four-wire VF telephone transmission line. Those patents disclose a technique for isolating the source of noise in a telephone transmission line. The technique consists of launching a monochromatic test tone from a test tone generator to some intermediate point along the line. The received test tone, together with any noise, is restructured at the intermediate point by filtering out the original test-tone frequency, amplifying the remaining "notched" noise, and adding it to the received signal or adding it to another test tone having the original amplitude and frequency and in phase with the received test tone, for transmission back along the line. The complete transmission path could be a loop returning to the test tone generator site ("loop-back testing") or a path to some other detection point where test equipment is available to analyze the received signal. This procedure results in the detection of amplified "notched" noise from the line portion under test, together with unamplified noise introduced after signal restructuring; in this way, the received signal which is analyzed by the test equipment reflects primarily the noise introduced in the line portion under test. Because of the coherence of the launched tones, diagnostic tests that are dependent upon the instantaneous phase and amplitude relation of the noise to the test tone can be performed.

In order to analyze the signals received at the test equipment, I disclose in my U.S. Pat. Nos. 3,906,173 and 3,927,281 telephone line characteristic measuring instruments for measuring and displaying (via oscilloscopes) impairments introduced during telephone line transmission. These instruments are capable of identifying the source of a disturbance (e.g. amplitude modulation, phase modulation, phase hits, background noise, etc.) and allow quantitative measurements to be made in real time. These or other measuring instruments may be used and the reading divided by the notched noise amplification factor.

In the aforementioned U.S. Pat. No. 4,061,892 it is further disclosed that the signal can be coherently restructured a second time just prior to analysis by the test equipment by attenuating the received disturbance relative to the test tone by the same factor that it was amplified at the intermediate point.

The prior art equipments are also designed for use upon signals arriving from a particular channel direction. Thus a single measuring instrument cannot be adapted to handle test signals from the east and from the west.

The prior art also does not address the problem of isolating a fault to one section of a noisy line in an extremely long circuit. Thus, for example, a local carrier in New York, who wishes to isolate the impairment on a cross-country line, is dependent upon tests performed by carriers in the proximity of the test tone sources which have to be located near the source of the problem. There was not disclosed any way by which a New York carrier could determine if the problem were in a short section of the line that was the specific responsibility of a carrier limited to California.

It is an object of this invention to eliminate the dependence on loop-around testing for the examination of notched noise, and instead, to provide a separate test to and from each maintenance interface of a four-wire facility in each direction from any VF appearance on the route.

It is a further object of this invention to permit a remote end user experiencing transmission difficulty with a multiple carrier VF circuit to determine which carrier is at fault.

It is a further object of this invention to enable the end user to identify the nature of the problem, i.e., whether it is caused by such noise-creating events as hits, jitter or distortion, regardless of the position of the carrier along the route, including the carrier whose facility is the problem source.

It is a further object of this invention to provide a simple but entirely secure remote control signalling system within the context of the four-line Dual-Tone Multi-Frequency (DTMF) system.

It is a further object of this invention to provide a remotely controlled system which is VF tone activated using tone detecting hardware which is only slightly different from that present in pre-existing VF carrier tone sensitive lines.

The present invention relates to apparatus called a carrier interface tester or CIT. The CIT is a VF tone responsive apparatus designed to be inserted into a four-wire VF phone line in which two wires are dedicated to carrying voice signals in either direction (preferably at a point where maintenance responsibility for the line changes) and to respond to remotely generated VF command signals on the line by establishing loop-around or one way test path arrangements and to execute either notched noise test modes or noise, gain or frequency translation test modes. Depending upon the mode addressed, these tests may be separately performed on the outboard path to the CIT from a test location or upon the return path from the CIT.

The present invention is particularly useful where more than one carrier has responsibility for the transmission along a long telephone line. It enables the user of the line to determine immediately which carrier is responsible for the portion of the line which is the source of the interference.

Where several CIT units are present on a single transmission line, they are adapted so that each is remotely addressable from either direction along the line and the line remains transparent to the CIT units which are not addressed. The present invention permits carrier interface testers to be placed along the transmission line at various points and to enable test equipment to be placed at any point along the line. Testing may be accomplished from either end of the circuit being tested or from any VF appearance in the path. The system isolates the tone based impairments immediately so that further diagnostic examination can continue at the test location, with tests, for example those described in U.S. Pat. Nos. 3,906,173 and 3,927,281, being performed.

The CIT is transparent to voice signals during the time that it is not engaged. VF addressing and command signals are interpreted by the CIT to engage various test circuits which select among the various test modes. These signals consist of specialized VF tones, which are frequency shifted from those normally recognized by telephone company DTMF detectors. Although non-standard frequencies are used for these shifted tones, they are chosen so that easily modified pre-existing hardware that recognizes the normal telephone transmission tones is capable of independently recognizing the command tones.

Further objects, features and advantages of my invention will become apparent upon consideration of the following detailed description in conjunction with the drawings, in which:

FIG. 1 depicts the method of incorporation of a carrier interface tester into a four wire VF phone line;

FIG. 3 shows an arrangement of CIT's on a phone line;

FIG. 4 is a table of DTMF shifted tones used to carry the command codes of this invention.

Figure 2:
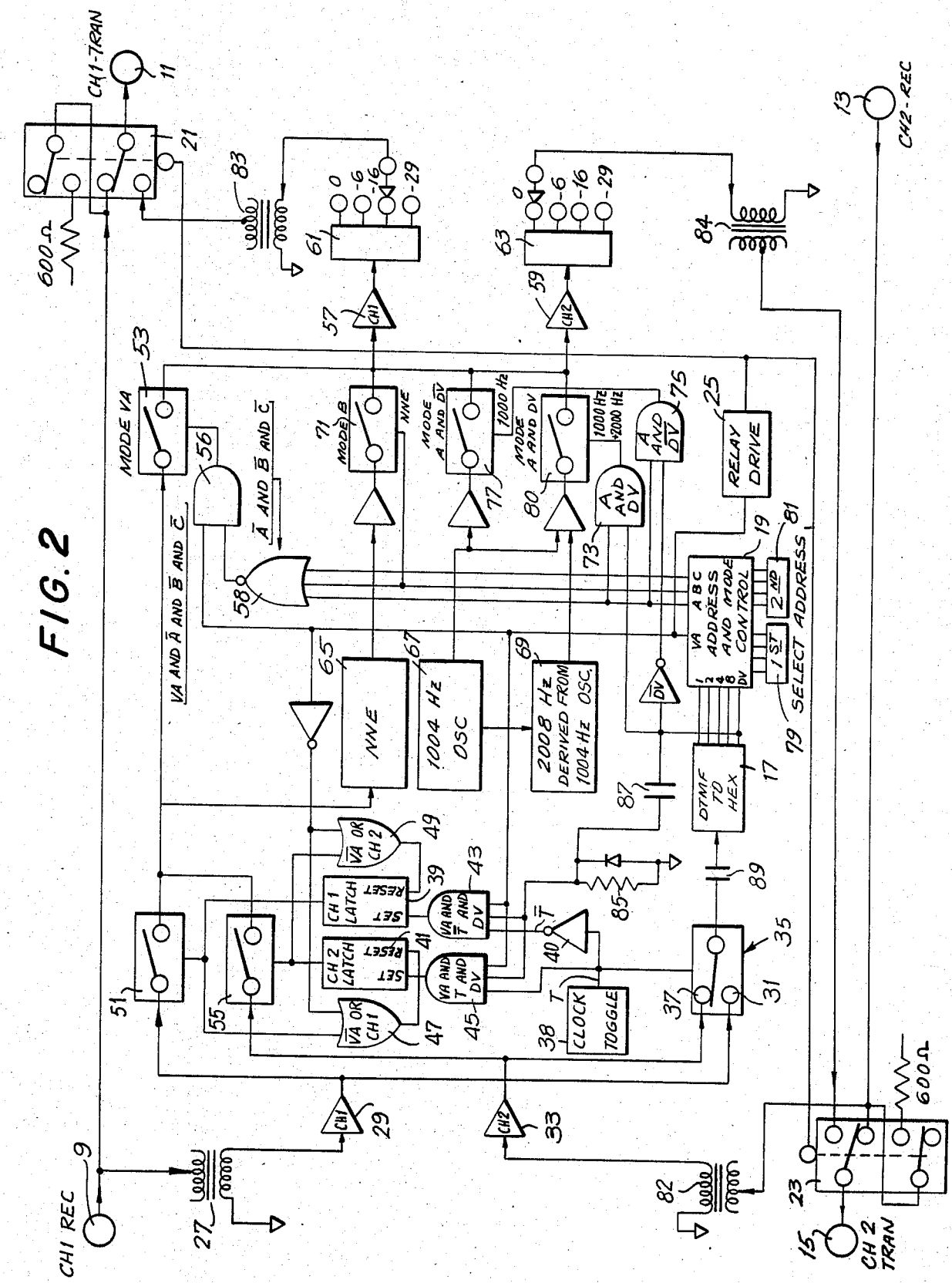
FIG. 2 is a schematic of a preferred embodiment of the CIT circuit.

A CIT of the preferred embodiment of the present invention is interconnected as depicted in FIG. 1 at the four-wire VF interface between two carrier sections where maintenance responsibility changes. The facilities are split and reconnected through the CIT. The channels of the circuit are termed CH1 and CH2 and enter at points 1 and 3 from the two directions as indicated.

Returning to FIG. 2, the two channels depicted as CH1 and CH2, carry VF signals in opposite directions. Each of the channels is split at the CIT unit into a receive (REC) and transmit (TRAN) side with respect to the unit. This is shown in the figure as follows: CH1-REC by numeral 9, CH1-TRAN by numeral 11, CH2-REC by numeral 13 and CH2-TRAN by numeral 15.

The CIT unit includes an address and mode control (A and MC) chip which responds to a four bit (hexadecimal) signal and a data valid signal (DV) output from a DTMF-to-HEX converter 17. DTMF is the acronym for dual-tone multi-frequency, a generic name for Touch-Tone signals used by the Bell system. Commercial DTMF-to-HEX devices of the required type are manufactured by Telephonics, Mitel and others. These convert a DTMF input to a five-line output comprising a hexadecimal code (1,2,4,8) and a data valid (DV) signal which indicates that a valid tone pair is at the input and that the hexadecimal output is valid.

DTMF-to-HEX converters that are acceptable for the present application are marketed by Silicon Systems Incorporated as SSI 202-P. These are CMOS integrated circuits employing eight bandpass filters to detect the individual tones and having a digital post-processor to time the tone durations. The digital outputs for hexadecimal digits become valid after a tone pair has been detected and they are cleared when a valid pause is timed.

The A and MC chip 19 responds by outputting a valid address (VA) and three mode control signals A, B and C in response to the information received from the DTMF-to-HEX converter 17. The A and MC chip is a logic element comprising gates and latches. It has two static inputs 79 and 81, each of which comprises four switches for representing a first or second hexadecimal digit address of the particular CIT. The two digits should not be the same to avoid confusing the A and MC chip. There are active inputs from the DTMF-to-HEX converter 17 corresponding to the hexadecimal digits O-F and the data valid signal DV. The A and MC latches its (valid address) VA output if it has detected a two-digit ordered address sequence corresponding to the first and second digit settings of the switches 79 and 81. The A, B and C outputs are energized by the A and MC chip when respective tone codes are received after a valid address. A received code D is treated as a pre-emptive code that resets all the internal A and MC registers. Means are also provided so that at power-up the A and MC module registers settle in the reset state.

In its quiescent state, shown in FIG. 2, relays 21 and 23 pass the CH1-REC signal directly to the CH1-TRAN output and pass the CH2-REC signal to the CH2-TRAN output. The CIT responds to signals at CH1-REC and CH2-REC via isolating transformers 27 and 82, and amplifiers 29 and 33 respectively. This is a bridging connection to the VF line. (These amplifiers, as well as amplifiers 57 and 59 and all others, may be provided with individual gain-controlling potentiometers.) The signals are applied to terminals 31 and 37 of a free-running switch 35 which is continuously toggled by clock 38. The switch transmits the signals alternately through a coupling capacitor 89 to the DTMF-to-HEX converter 17. In this way, potential control signals from both Channel 1 and Channel 2 are sampled for processing by the A and MC chip. The period of the clock 38 is at least twice the period of the DTMF to HEX and A and MC response times. In response to the recognition by the A and MC chip 19 of a valid address (and a DV signal from the DTMF to Hex Converter) one and only one of the latches 39 and 41 is set according to the state of switch 35. This will determine which of the two REC channels shall be in control of the CIT until the CIT is reset.

Specifically, in the situation where one of the two channels is being used to gain control over the CIT, an address signal coming, say, over Channel 1 would cause the DV output of the DTMF-to-HEX converter 17 to go high. The A and MC chip will generate a VA signal upon receipt of the second of the two digits from the DTMF-to-HEX converter constituting a valid address. The output of gate 43 goes high to set latch 39 when clock 38 causes switch 35 to assume the position other than that shown, at which time the output of inverter 40 is high. Conversely, if Channel 2 carried the address signals seeking to gain control of the CIT, the only difference would be that the output of clock 38, rather than the output of inverter 40, would be high when the DV and VA outputs go high. Gate 45 would then set the Channel 2 latch 41 so that Channel 2 would remain in control of the CIT.

Provision is made so that under no circumstances can latch 39 and latch 41 both be set at the same time. In the depicted embodiment, the two latches are cross coupled through the OR gates 47 and 49 which reset their respective latches 41 and 39 when either one of two conditions occurs: either the A and MC chip no longer latches its VA output high, or the opposing channel's latch is set. Once a latch sets, it forces the reset input of the other latch to be held high; once a complete address has been received (2 digits) continued toggling of switch 35 cannot result in setting of the other latch even if the other channel tries to secure control over the CIT. In an alternative embodiment, the free-running switch may be stopped, or the opposite input channel (37 or 35) may be opened, once one channel has seized control to prevent the other channel from transmitting signals that might attempt to gain control. The purpose of resistor 85 and capacitor 87 is to shorten the DV pulse applied to gates 43 and 45 so that the pulse does not overlap a phase of clock 38.

The CIT is addressable from either direction because of the operation of the toggle switch mechanism that samples incoming signals from either direction and latches the circuit when a valid address is received coincident wwith the clock pulse associated with that direction.

Relay drive 25 responds to the VA output of the A and MC chip 19, going high to energize relays 21 and 23. The CH1-REC and CH2-REC signals are no longer connected to their respective transmit channels. Instead, the CH1-TRAN and CH2-TRAN channels will receive whatever signals are applied to them by transformers 83 and 84, respectively. The receive channels are now terminated by 600 ohm resistors. (Relays 21 and 23 are the only electro mechanical elements; all of the switches are solid-state devices.)

In response to the setting of the latch 39 or 41, either CH1-REC or CH2-REC is transferred to the input of the mode VA switch 53 via the switch 51 (if Channel 1 is in control) or switch 55 (if Channel 2 is in control). The mode VA switch 53 is open unless, as determined by AND gate 56 and NOR gate 58, VA is high and outputs A, B and C of the A and MC are low. If that situation obtains, the CH1-REC signal, which is passed through switch 51 and then through the mode VA switch 53, is available at both CH1-TRAN and CH2-TRAN via the amplifiers 57 and 59 and transmission level adjusters 61 and 63, respectively. To assure this condition, A, B, and C should not be used as the second digit of the address of the CIT; otherwise, "mode VA" would never be selected since one of the A, B or C modes would result immediately following transmission of the send address digit. (Because the two address digits should be different, digit D cannot be used as an address digit at all, and digits A, B, and C cannot be used as the second address digit, there are 156 addresses in all.) Thus, when a valid address is recognized, the relays are activated so that the CIT ceases to be transparent. Upon VA going high, the CIT is in the loopback (VA) mode.

This is a simple loop-back condition as seen by the user who, for example, employs the CH1-REC line for control purposes. At the same time, the Channel 2 receive signal is blocked. Observation of the Channel 1 transmit line 11 and Channel 2 transmit line 15 would both show transmission from the Channel 1 receive line 9, as influenced by the test level amplifiers (attenuators) 61 and 63.

This "equal level" loop-back mode enables establishing a base line gain and noise level for the loop-around unit so that the receive level at CH1-REC can be deduced in subsequent modes A. Loop-around noise is measured by terminating the transmit side at the test center and measuring the receive noise level. Loop-around gain can be measured by sending 1000 Hz from the test center and measuring the receive level, also at the test center.

The other gates of the CIT enable the selection of the other modes.

The CIT has three signal sources; a notched noise enhancer (NNE) 65, a 1004 Hz oscillator 67, and a 2008-Hz oscillator 69 derived from oscillator 67.

The notched noise enhancement is effective only when switch 71 is closed in response to the B output of the A and MC going high. In that event the NNE signal is fed into amplifiers 57 and 59 to become available on both transmission channels.

The mode C signal by itself will not enable any of the paths from sources 65, 67, 69 and disalbes the mode VA switch 53 through NOR gate 58 and, hence, provides a quiet termination for the receive signal. This means that there is no enhancement generated by the CIT. The mode A signal, applied to gates 73 and 75 is ANDed with DV and not-DV, respectively. The output of gate 73 controls switch 80 to supply both the 1004 Hz and the 2008 Hz signal to the output amplifiers 57 and 59. The output of gate 75 provides only the 1004 Hz signal from the oscillator 67 through switch 77 to the output amplifiers. Because DV is high only while the tone pair corresponding to digit A is being received, the system operates in one mode while the command is being sent, and it operates in another mode after the command digit transmission ceases. (None of the mode digits should be used as the second address digit, as described above, or else the VA mode will be skipped. Thus, the greater the number of mode command digits, the fewer the total number of possible addresses. Using digit A to control two modes thus saves addresses.)

Finally, there is a reset mode D whose operation resets the A and MC chip. Also, VA low at any time resets both of latches 39 and 41, and returns the system to its transparent state.

In view of the different modes, it is possible to separately test portions of a line in each direction for notched noise components in mode B, and to check for return loss, gain and noise through use of the other modes as explained further below.

In use, a CIT may be located at each telephone company interface and at each customer termination. FIG. 3 shows a setup in which several CITs are placed along a four-line VF system. The test equipment containing test-tone generators is shown between CITs #2 and CIT #3, and is capable of testing either to the left or to the right in the line, in sections up to or separately beyond each of the CITs that are depicted. The test equipment could also be located at the position of one of the data sets in which case it can test either direction of the transmission line up to whichever one of the CITs it addresses through its tone addressing mechanism. Thus, the facility can be split at any point and examined in either direction as shown in FIG. 3. In the event of transmission trouble, using this hardware the user can identify both the carrier at fault and the nature of the problem with a single maintenance request.

The outbound path to the CIT from the test location and the return path to the test location from the CIT can be separately examined. The invention eliminates dependence on loop-around testing by providing separate testing in each direction. Monitoring can be established from either end or from any intermediate position examining in either direction. Monitoring can also occur from any VF appearance along the path since the signals which activate the CIT are merely VF transmissions.

In operation, the four-wire VF interface between two carrier sections is split and reconnected through the CIT. The receive side inputs CH1-REC and CH2-REC are bridged onto the line. The transmit side outputs are normally through-connected to the corresponding inputs by the contacts of relays 21 and 23. Both inputs and outputs of the CIT are transformer isolated.

In operation the following sequence of signals is transmitted to the CIT. First, D is sent. This is the reset code for all A and MC modules, so that no matter what the state of any CIT in the path, it is restored to normal through-connected operation.

Then the first digit of the address is sent (for example, "1"). The A and MC internal first digit latch (for any unit whose first address digit is "1") registers this occurrence and readies to accept the second digit. This is an internal latch and provides no output.

Next, the second digit of the address (for example, "9") is sent. That A and MC whose address is sent has its VA output latch go high. The first digit latch for all other A and MC units which had been set by "1" as a first digit are reset by the second digit "error". If any unit has 9 for a first digit it will be enabled and waiting for its second digit until a mode command (A, B or C) is sent.

Next A, or B, or C is sent. That A and MC which is in the VA mode has its A, B or C output latched. VA continues to be high. It is possible to switch between the A, B and C modes by sending any of these three codes. A new mode command code resets the previous code latch and sets the new latch.

Any DTMF code other than the second address code, A, B, or C causes the A and MC to be reset. At any time, D resets all A and MC units.

While the A key is held down at the test center, the DV output of the DTMF-to-HEX converter is high. This closes the mode A and DV switch 80. The second harmonic which is generated from the 1004-Hz oscillator is added to the 1004-Hz oscillator. The harmonically rich tone is the probing signal to determine if any frequency translation is present between the CIT and the test center. The technique is described in U.S. Pat. No. 3,927,281. The second harmonic is scaled to be large enough so that it is clearly distinguishable from other components of the notched noise. When the A key is released, only the 1004-Hz tone is sent. This mode is also the vector display notched noise test mode for determining the impairments in the return path, for example, by the methods disclosed in U.S. Pat. No. 3,906,173.

In mode B, the Channel 1 receive signal is connected to the Channel 2 transmit via the NNE (assuming that the test site is to the left of FIG. 2). A nominally 1000-Hz signal may be transmitted from the test center in accordance with U.S. Pat. Nos. 4,021,625 and 4,061,892. The return path from the CIT to the test center is effectively transparent and permits all components of notched noise in the outbound path (from the test center to the CIT) to be monitored at the test center in real time.

In mode C, all mode switches are open so there is no signal into the output attenuators 61 and 63. The CIT thus provides a quiet termination on the transmit channels. Relays 23 and 21 have already provided quiet terminations on the receive channels. In this mode, the noise in the return path (transmit Channel 2 to test center if the test center is to the left of FIG. 2) can be measured at the test center. Return loss measurements on that part of the four-wire circuit between the test center and CIT can also be measured. This is accomplished by sending a frequency weighted white-noise signal toward the CIT from the test center and measuring the signal returned. It can also be measured by using a swept frequency source and correlated detector to measure return loss versus frequency.

The offset DTMF codes are tabulated in FIG. 4 and are spaced in frequency by approximately 4.9% from the standard frequencies. The permissible detection range for a DTMF receiver is that it must detect within 1.5% and must not detect greater than 3.5%. Thus, if a crystal reference transmitter is constructed to send tones which are accurately 4.9% below standard frequencies and a similarly accurate crystal reference DTMF receiver is constructed so that its detection center value is the same, then this receiver will ignore standard DTMF tones. Furthermore, the standard DTMF receivers distributed along the line will ignore the CIT signalling tones. This is true even in the case of maximum permissable frequency translation, which, in the Bell system, is less than 8% of the lowest DTMF frequency. The offset DTMF has the same reliability as standard DTMF and will not respond to standard DTMF tones which may be on line either accidentally or purposefully, nor will the offset DTMF interfere with standard DTMF equipment which for any reason may be monitoring the facility.

Figure 5A:
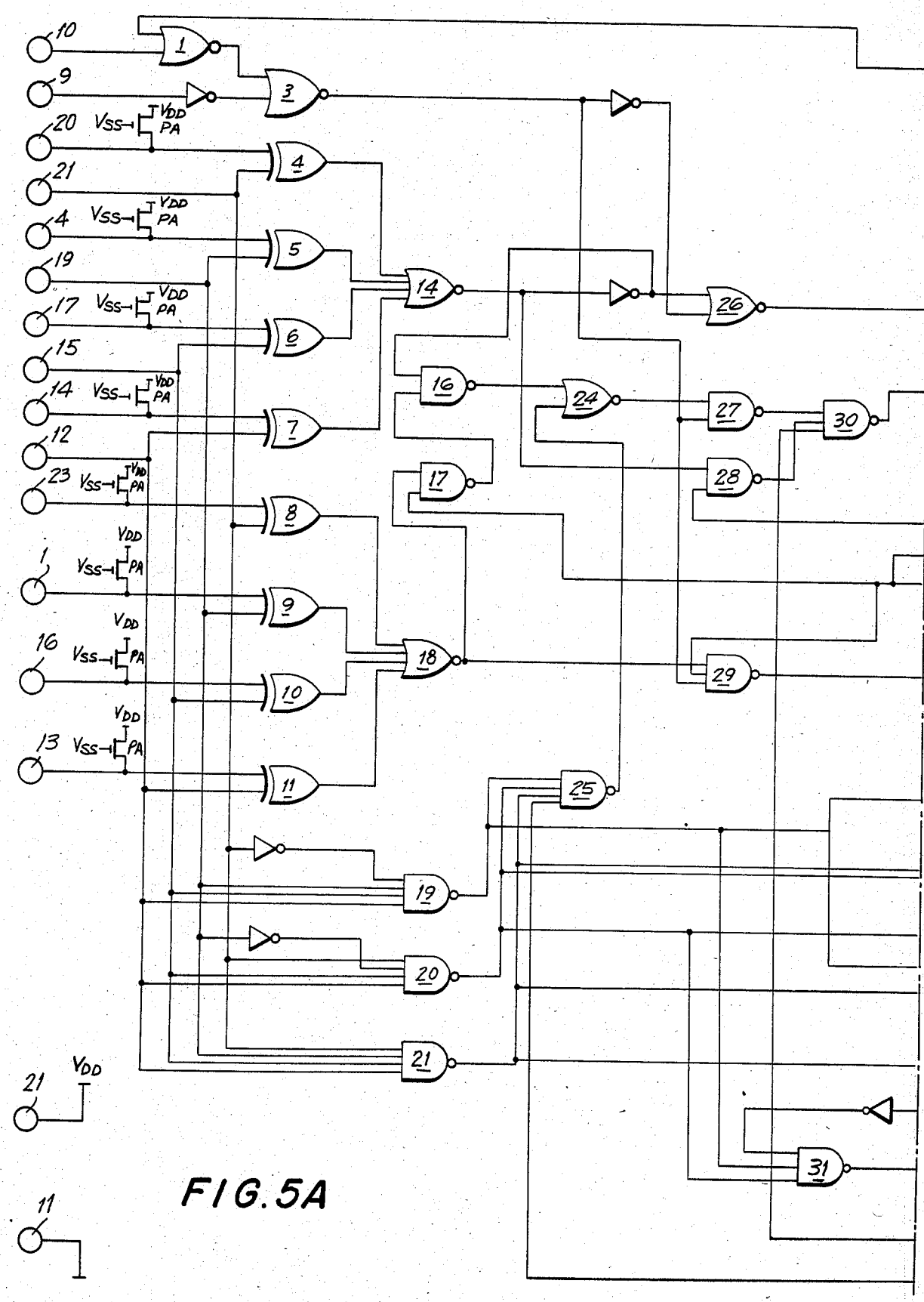
FIGS. 5A and 5B, with FIG. 5A being placed to the left of FIG. 5B, are a schematic of element 19 in FIG. 2.
Figure 5B:
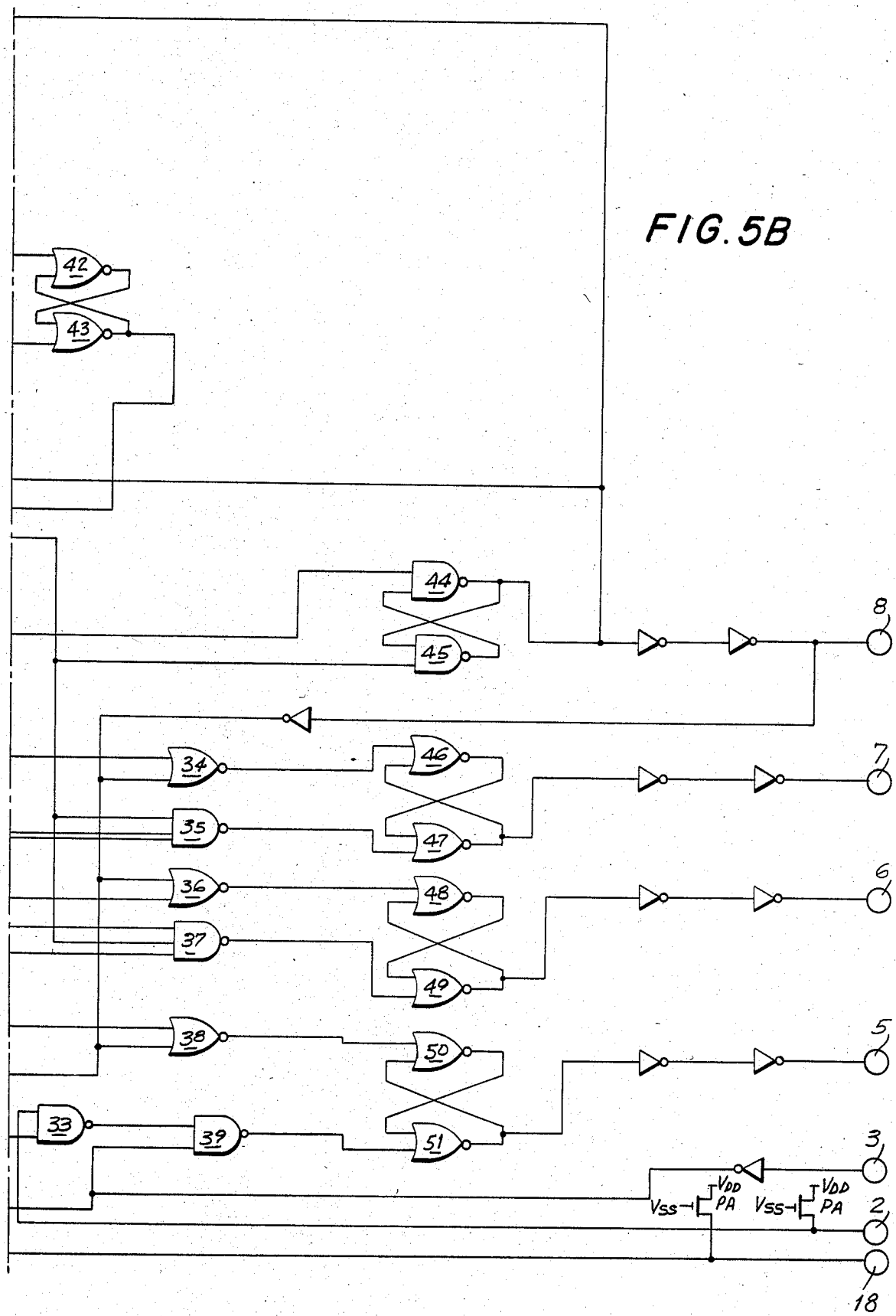

The logic circuitry for the A and MC chip is shown in FIGS. 5A and 5B. The reference numerals referred to in the following discussion refer to FIGS. 5A and 5B and not the reference numerals of FIGS. 1–4. The address and mode control chip is a 24-pin MOS circuit, which is equivalent to the RCA 4000 B series CMOS with regard to electrical properties.

The first digit of the address is set up on pins 20, 4, 17, and 14 with a HEX code. Each of these pins is grounded for a logic zero and left open for a logic one. There are internal pull-up devices in the chip so that no resistors are required. The input BCD code is connected to pins 21, 19, 15, and 12. Exclusive OR gates 4, 5, 6, and 7 have low outputs if their two inputs are the same. If all four gates have their input codes matching, gate 14 goes high. A data valid logic signal on pins 9 and 10 will cause NOR gate 3 to go high. The two inputs to NOR gate 26 will be low and latch 42, 43 will be set. The output of gate 43 is now high and latch 44, 45 may be set upon receipt of the second digit.

The second digit code is set on pins 23, 1, 16, and 13 in a manner similar to setting the first digit. A data valid signal, and the second digit after the first digit is set, sets latch 44, 45. Any code after the first digit except the second digit resets latch 42, 43. It is important not to program the same number for the first and second digits. If this is done and then the digit appears as an input, the response wil not be useful as latch 44, 45 wil open as soon as the tones representing the digit are removed.

After receipt of the second digit, pin 8 will be high indicting reception of a valid address. Latch 46, 47 is set with Touch Tone code "B" and pin 7 will go high. Latch 48, 49 is set with Touch Tone code "A" and pin 6 will go high. Latch 50, 51 is set by Touch Tone code "C" and pin 5 will go high. A, B, or C are mutually exclusive. After selecting A, B, or C the unit may be switched back and forth among these three. NAND gates 19, 20, and 21 detect the presence of B, A, or C respectively. Gate 25 permits acceptance of A, B, or C without causing a disconnect. Pin 18 (not necessary) permits an external control. External logic is required to decode any additional commands and to latch them if desired. Pin 2 may be used to permit leaving the unit in mode "C" after disconnecting or resetting latch 44, 45. Disconnect or reset is accomplished with any code other than the second digit or A, B, or C, or any other code established by using pin 18. D is usually reserved for disconnect.

At power-up it is desirable that all latches be reset. Pin 3 is a master reset which may be connected via an RC circuit to provide a low normally, but a high during power-up.

The particular circuit used for the A and MC is not important, and other circuits may be designed. It is the sequencing and control functions which are important, and there are a variety of ways to achieve them as will be apparent to those skilled in the art.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

I claim:

1. A transmission line test system comprising a first-direction input and output, and a second-direction input and output; means operative in a quiescent state for establishing through-connections in both directions; means for assigning an address to the system; means for recognizing signals representing the assigned address appearing at either one of said direction inputs for breaking said through-connections and for enabling subsequent responses to commands which appear at said one direction input; and means responsive to commands which appear at said one direction input for controlling an application of respective signals to the other one of said direction outputs.

2. A system in accordance with claim 1, wherein said recognizing means causes the system to remain transparent in both directions in a transmission line in which it is inserted responsive to addresses other than the assigned address appearing at either direction input.

3. A system in accordance with claim 2, wherein said recognizing means includes means for recognizing invalid commands and in response thereto for controlling restoration of said through connections.

4. A system in accordance with claim 1, wherein said controlling means causes the same respective signals also to be applied to said one direction output.

5. A system in accordance with claim 1, wherein said recognizing means includes means for examining alternately the two inputs in order to determine the direction from which the recognized address was sent.

6. A system in accordance with claim 1, wherein said address signals and said commands both have a form of dual tones which are offset from dual tones used in normal telephonic signalling so as to avoid interference therewith.

7. A system in accordance with claim 1, wherein said controlling means when applying respective signals to said other one of said direction outputs operates in several respective modes, with at least two of said modes being controlled by a single command, one while the command appears at said one direction input and the other after the command has ceased to appear.

8. A transmission line test system comprising a first-direction input and output, and a second-direction input and output; means normally operating to establish through-connections in both directions; means responsive to predetermined commands which appear at either direction input for controlling operations in respective modes; and means operative when the test system is controlled to operate in said respective modes for disabling said normally operating means.

9. A transmission line test system comprising a first-direction input and output, and a second-direction input and output; means normally operating to establish through-connections in both directions; means for recognizing a predetermined signal appearing at one of said direction inputs for disabling said normally operating means and for enabling subsequent responses to commands which appear at said one direction input; and means responsive to predetermined commands which appear at said one direction input for controlling operations in respective modes.

10. A system in accordance with claim 9, wherein said recognizing means causes the system to remain transparent in both directions in a transmission line in which it is inserted responsive to addresses other than an assigned address appearing at either direction input.

11. A system in accordance with claim 9, wherein said recognizing means includes means for recognizing invalid commands and in response thereto for controlling restoration of said through-connections.

12. A system in accordance with claim 9, wherein said controlling means causes respective signals to be applied to the other one of said direction output.

13. A system in accordance with claim 12, wherein said controlling means causes said respective signals also to be applied to said one direction output.

14. A system in accordance with claim 9, wherein said recognizing means includes means for examining alternately a two inputs in order to determine the direction from which the recognized address was sent.

15. A system in accordance with claim 9, wherein said address signals and said commands both have a form of dual tones which are offset from dual tones used in normal telephonic signalling so as to avoid interference therewith.

16. A system in accordance with claim 9, wherein said controlling means when applying respective signals to the other one of said direction outputs operates in several respective modes, with at least two of said modes being controlled by said commands, a first of said modes while a command appears at said same direction input and the other of said modes after the command has ceased to appear.

17. A bidirectionally addressable VF remote controlled interface unit for a four-line telephone communication system having a pair of channels, each channel having an input and transmit line connected to the interface unit; said unit comprising
   (a) a plurality of signal source means connectable to the transmit line of each channel.
   (b) gate means adapted to selectively connect said signal sources to the two transmit lines in response to commands issued to said gate means,
   (c) mode control means adapted to output commands to said gate means in response to mode signals received on either input line,
   (d) means to enable only one of said input lines to control mode selection and to disable the other input line from issuing mode signals to said mode control means, wherein said enabling means is adapted to maintain in control of mode selection a first input channel that transmits the address of the interface unit until a release signal is issued.

18. The unit of claim 17, wherein said signal source means comprises one or more means selected from a group consisting of, (a) tone launch means
(b) tone launch plus harmonic launch means
(c) notched noise enhancement means
(d) quiet termination means
(e) equal level loopback circuit means 19. The unit of claim 17, wherein said enabling means alternately enables each input line to issue addressing data to an address recognition means until a valid address is received.

20. The unit of claim 19, wherein said enabling means comprises a free-running oscillator driven switch to alternately enable each channel.

21. The unit of claim 20, wherein said oscillator driven switch is adapted to cease running after a valid address is transmitted to the unit.

22. The unit of claim 20, wherein said enabling means comprises means for preventing an input channel other than said first input channel from resetting said enabling means.

23. A VF tone responsive apparatus for a VF phone line over which phone line standard DTMF tones are transmitted, said apparatus including means for recognizing specialized DTMF tones which are offset in frequency from corresponding tones on the standard DTMF tone set by at least 3.5 percent.

24. The VF tone responsive apparatus as claim 23, wherein said specialized VF tones are spaced in frequency by approximately 4.9 percent from said standardized frequencies.

25. The VF tone responsive apparatus as claim 23 having a crystal reference transmitter, said crystal reference transmitter adapted to send tones accurately by a fixed frequency below or above the standard frequency.

26. The VF tone responsive apparatus of claim 25 wherein said fixed frequency is about 4.9 percent below or above said standard frequency.

* * * * *